US012666107B2

(12) United States Patent
Ma et al.

(10) Patent No.: US 12,666,107 B2
(45) Date of Patent: Jun. 23, 2026

(54) METHOD, APPARATUS, DEVICE AND STORAGE MEDIUM FOR PROCESSING PLAYING LOUDNESS OF MEDIA DATA

(71) Applicant: Beijing Zitiao Network Technology Co., Ltd., Beijing (CN)

(72) Inventors: Ye Ma, Beijing (CN); Chang Xiao, Beijing (CN); Shilei Liu, Beijing (CN); Tong Wu, Beijing (CN); Zhiguang Zhang, Beijing (CN); Xin Zhang, Beijing (CN); Jing Li, Beijing (CN); Shichao Ge, Beijing (CN); Hao Huang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/809,931

(22) Filed: Aug. 20, 2024

(65) Prior Publication Data

US 2025/0071371 A1      Feb. 27, 2025

(30) Foreign Application Priority Data

Aug. 23, 2023    (CN) .......................... 202311070259.9

(51) Int. Cl.
*H04N 21/439* (2011.01)
*G06F 3/16* (2006.01)

(52) U.S. Cl.
CPC ........... *H04N 21/439* (2013.01); *G06F 3/165* (2013.01)

(58) Field of Classification Search
CPC ............................. H04N 21/439; G06F 3/165
See application file for complete search history.

(56) References Cited

U.S. PATENT DOCUMENTS

| | | | | |
|---|---|---|---|---|
| 9,431,982 B1 * | 8/2016 | Yang | ......................... | H03G 3/20 |
| 9,661,438 B1 * | 5/2017 | Yang | ...................... | H04R 3/007 |
| 11,381,209 B2 * | 7/2022 | Chung | ................. | H04R 1/1083 |
| 2014/0294200 A1 * | 10/2014 | Baumgarte | ........... | G10L 19/008 |
| | | | | 381/107 |
| 2015/0363160 A1 * | 12/2015 | Riedmiller | ............. | H04R 29/00 |
| | | | | 700/94 |
| 2016/0211821 A1 * | 7/2016 | Grosche | ................. | H03G 7/002 |
| 2016/0344356 A1 * | 11/2016 | Grosche | .............. | H03G 11/008 |
| 2020/0067476 A1 * | 2/2020 | Gorlow | .................... | H03G 9/06 |
| 2021/0005211 A1 * | 1/2021 | Stahlmann | ............ | G10L 19/008 |
| 2022/0166397 A1 * | 5/2022 | Chung | .................... | G06F 3/165 |
| 2025/0218450 A1 * | 7/2025 | Ma | .......................... | G10L 21/02 |

* cited by examiner

*Primary Examiner* — John W Miller

(74) *Attorney, Agent, or Firm* — Alleman Hall LLP

(57) ABSTRACT

The disclosure relates to the technical field of computer processing, and discloses a method, an apparatus, a device and a storage medium for processing playing loudness of media data. The method according to the disclosure comprises obtaining media data to be played and an audio feature of the media data to be played; obtaining loudness requirement information, wherein the loudness requirement information comprises a current playing environment and/or an attribute of a playing device; determining loudness processing information for the media data to be played based on the audio feature and the loudness requirement information; and processing the media data to be played based on the loudness processing information to obtain target media data for playing.

19 Claims, 6 Drawing Sheets

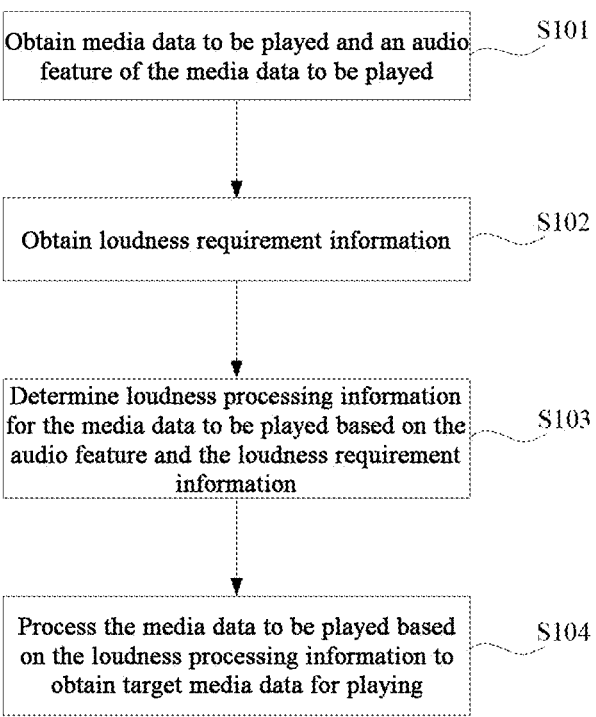

Obtain media data to be played and an audio feature of the media data to be played ⟋ S101

Obtain loudness requirement information ⟋ S102

Determine loudness processing information for the media data to be played based on the audio feature and the loudness requirement information ⟋ S103

Process the media data to be played based on the loudness processing information to obtain target media data for playing ⟋ S104

FIG. 1

METHOD, APPARATUS, DEVICE AND STORAGE MEDIUM FOR PROCESSING PLAYING LOUDNESS OF MEDIA DATA

CROSS-REFERENCE TO RELATED APPLICATION(S)

This application claims priority to Chinese Application No. 202311070259.9 filed Aug. 23, 2023, the disclosure of which is incorporated herein by reference in its entity.

FIELD

The disclosure relates to the technical field of computer processing, and particularly relates to a method, apparatus, device and storage medium for processing playing loudness of media data.

BACKGROUND

Since different pieces of media data are created with different publishing loudness, playing loudness of all media data needs to be balanced when the media data are played at a terminal side. That is, loudness of all media data needs to be unified. For this purpose, media data with various loudness are generally pulled to the same playing loudness through the volume gain and forced clipping.

SUMMARY

In view of that, the disclosure provides a method, an apparatus, a device, and a storage medium for processing playing loudness of media data, so as to solve a problem of playing loudness balance.

In a first aspect, the disclosure provides a method for processing playing loudness of media data. The method comprises the following steps:

obtaining media data to be played and an audio feature of the media data to be played;

obtaining loudness requirement information, where the loudness requirement information comprises a current playing environment and/or an attribute of a playing device;

determining loudness processing information for the media data to be played based on the audio feature and the loudness requirement information; and processing the media data to be played based on the loudness processing information to obtain target media data for playing.

In a second aspect, the disclosure provides an apparatus for processing playing loudness of media data. The apparatus comprises:

a data obtaining module configured to obtain media data to be played and an audio feature of the media data to be played;

a requirement information obtaining module configured to obtain loudness requirement information, where the loudness requirement information comprises a current playing environment and/or an attribute of a playing device;

a processing information determination module configured to determine loudness processing information for the media data to be played based on the audio feature and the loudness requirement information; and an audio processing module configured to process the media data to be played based on the loudness processing information to obtain target media data for playing.

In a third aspect, the disclosure provides a computer device. The computer device comprises: a memory and a processor. The memory is in communication connection with the processor. The memory stores a computer instruction. The processor executes the method for processing playing loudness of media data according to the first aspect or any one of embodiments corresponding to the first aspect by executing the computer instruction.

In a fourth aspect, the disclosure provides a computer-readable storage medium. The computer-readable storage medium stores a computer instruction. The computer instruction is configured to enable a computer to execute the method for processing playing loudness of media data according to the first aspect or any one of embodiments corresponding to the first aspect.

In the method for processing playing loudness of media data according to the examples of the disclosure, loudness processing is conducted on the media data to be played at a playing side. The current playing environment or the attribute of the playing device may influence playing of the media data, so even the same media data may cause different auditory perception when it is played in different environments or on different playing devices. In view of this, when the media data is processed at the playing side, the loudness requirement information such as the current playing environment and/or the attribute of the playing device is combined with the audio feature, such that the obtained loudness processing information can not only satisfy a demand of the audio itself, but also satisfy a demand of the environment or the hardware device. In this way, adaptive adjustment of the playing loudness of the media data to be played can be implemented, and a playing effect of the media data to be played can be improved.

BRIEF DESCRIPTION OF THE DRAWINGS

In order to more clearly illustrate technical solutions in specific embodiments of the disclosure or in the prior art, the accompanying drawings required for the description of the specific embodiments or the prior art will be briefly introduced below. Obviously, the accompanying drawings in the following description are some embodiments of the disclosure, and those of ordinary skill in the art can still derive other drawings from these accompanying drawings without any creative effort.

FIG. 1 is a schematic flow diagram of a method for processing playing loudness of media data according to an example of the disclosure;

DETAILED DESCRIPTION OF EMBODIMENTS

Figure 2:
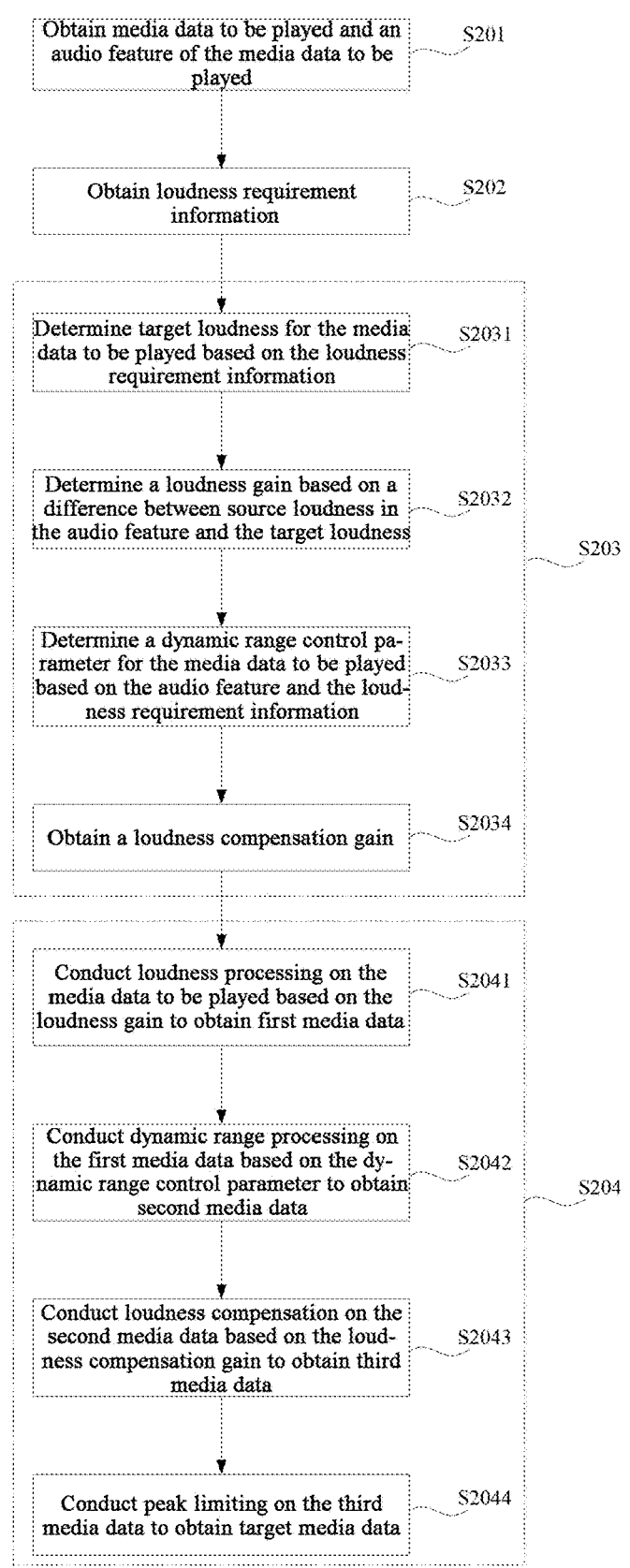
FIG. 2 is a schematic flow diagram of another method for processing playing loudness of media data according to an example of the disclosure.

For making objectives, technical solutions and advantages of examples of the disclosure more obvious, the technical solutions in the examples of the disclosure will be clearly and completely described below in conjunction with the accompanying drawings in the examples of the disclosure. Obviously, the described examples are some examples rather than all examples of the disclosure. Based on the examples of the disclosure, all other examples obtained by those skilled in the art without making creative efforts fall within the protection scope of the disclosure.

In the related art, loudness processing is conducted on a playing end in a one-size-fits-all mode. For instance, most inconsistent loudness of audios is pulled to the same loudness through multiplication of a loudness gain. However, this processing does not take into account influence of different factors on user experience of audio loudness when different users play videos. Examples of the factors comprise maximum sound pressure that a playing device may reach, an ambient sound, a user preference and audio content. Specific examples of the factors are as follows: which player, e.g., a mobile phone speaker or an earphone being used by the user; the maximum sound pressure limit can be reached by the playing device without distortion; the environment, e.g., a noisy environment or a quiet environment, where the user is playing; the user preference, e.g., preference of listening to an audio having a larger dynamic range even with some regularity in loudness lost, or preference of unity of loudness such that the more dynamic range compression may be applied; and whether a current audio is pure speech or pure music or a mixture of speech and music, or news, movies and other content. For different content, such as content having different speech ratios, the target loudness should be finely adjusted for the auditory perception, so as to ensure that the loudness heard by users is consistent.

In some application scenes, due to different publishing loudness of different media data to be played or different device capabilities of the playing end, different short videos may have obviously different loudness when being played at the same playing end. That is, some short videos have high loudness, and some short videos have low loudness. In this case, a user needs to manually adjust the volume so as to adapt to different short videos.

In view of this, a method for processing playing loudness of media data according to the disclosure is provided to solve a problem that a user has different experiences of the audio loudness when playing media data. As such, the user can obtain loudness suitable for a current scene in any use scene, and the following situations can be avoided to the greatest extent. For instance, the maximum volume of a device still does not reach a required volume, or the minimum volume of a device is still higher than a required volume, or a user needs to adjust the volume in a same video, or a user needs to adjust the volume between different videos, or an audio played on a high-end speaker at a low volume has excessive loudness but insufficient dynamics, or a low-volume part of a video cannot be clearly heard at a normal volume on a low-end speaker.

At the playing end, a video cloud server transmits transcoded media data to be played and an audio feature of the media data to be played to the playing end, and target media data is obtained for playing through the processing of the method for processing playing loudness at the playing end.

An example of the disclosure provides a method for processing playing loudness of media data. It should be noted that steps illustrated in flow diagrams of the accompanying drawings may be executed in a computer system such as a set of computer-executable instructions, and although a logical order is illustrated in the flow diagrams, in some cases, the steps shown or described may be executed in an order different from that herein.

The example provides a method for processing playing loudness of media data, which may be applied to the computer device, such as a computer, a mobile phone, and a tablet computer. FIG. 1 is a flow diagram of a method for processing playing loudness of media data according to an example of the disclosure. As shown in FIG. 1, the flow comprises the following steps:

S101, media data to be played and an audio feature of the media data to be played is obtained.

The media data to be played is media data to be played, including but not limited to a video or an audio, received by the playing end. A form of the media data to be played is not limited herein, and is set according to actual needs. For instance, a short video playing application is configured on the playing end. When a user plays a short video with the short video playing application, a corresponding video, that is, the media data to be played, is pulled from a server of the short video playing application.

The audio feature of the media data to be played may be obtained at a media data creation end and transmitted to the playing end together with the media data to be played. Alternatively, the audio feature may be obtained by analyzing features of audio data of the media data to be played as required after the playing end obtains the media data to be played. Alternatively, some audio features may be obtained by a creation end, and the other audio features may be obtained by analyzing features at the playing end as required. Clearly, an obtaining mode of the audio feature is not limited to the above description, and may also be another mode, which is not limited herein.

The audio feature comprises, but is not limited to, source loudness, a speech ratio, a dynamic range, a loudness peak value, audio content, etc. A specific feature comprised is determined according to actual needs.

S102, loudness requirement information is obtained.

The loudness requirement information comprises a current playing environment and/or an attribute of a playing device.

The loudness requirement information is requirement for a current playing scene of a playing end, and for instance, a playing environment, the attribute of the playing device, a user preference, etc. The current playing environment refers to a noise level and a loudness requirement of an environment in which a user is currently located, which may be an indoor environment, an outdoor environment, or on a road. The current playing environment may generally be obtained by analyzing usage habits of the user combined with variables such as location positioning, noise collection microphone and a time stamp. The attribute of the playing device comprises a playing capability, playing sensitivity and a maximum sound pressure level of the playing device, etc. Generally, the greater power of the playing device, the smaller loudness is required. The user preference refers to user's requirement for loudness, which may be determined after interaction with a terminal in an interaction mode provided by the terminal.

S103, loudness processing information for the media data to be played is determined based on the audio feature and the loudness requirement information.

The loudness processing information for the media data to be played is related to a mode of processing the media data to be played. If the media data to be played is processed in a mode of dynamic range control (DRC), the loudness processing information comprises a parameter of a DRC curve. DRC refers to mapping a dynamic range of an input audio signal to a designated dynamic range, which may make sound softer or louder, that is, in a mode of adjusting a signal amplitude. Generally, a dynamic range after mapping is smaller than that before mapping, so the processing is referred to as dynamic range compression. An audio signal may be integrally subjected to dynamic range control, or may be divided into several sub-bands for the dynamic range control respectively.

If loudness gain processing is conducted on the media data to be played, the loudness processing information comprises a specific size of a gain, which is obtained through a difference between source loudness and target loudness in the media data to be played. If processing of the media data to be played also comprises gain smoothing processing, a starting time, a releasing time and a holding time need to be further determined, such that a sharp change of a gain is reduced through the gain smoothing processing, and artifacts and an unnatural sound are avoided.

The loudness processing information is determined based on the audio feature and the loudness requirement information. For instance, a network model may be trained in advance. The input of the network model is the audio feature and the loudness requirement information, and the output of the network model is the corresponding loudness processing information. The network model is obtained by training a large number of pieces of sample data. A specific network structure of the network model is set according to actual needs, which is not limited herein.

The loudness processing information may also be obtained through digital signal processing based on the audio feature and the loudness requirement information. For instance, the parameter of the DRC curve comprises a slope. The slope may be computed from the source loudness in the audio feature and the attribute of the playing device in the loudness requirement information.

S104, the media data to be played is processed based on the loudness processing information, and target media data for playing is obtained.

As mentioned above, the loudness processing information is related to a mode of processing the media data to be played. Therefore, after the loudness processing information is obtained, the media data to be played is processed through the loudness processing information in a corresponding processing mode, such that the target media data is obtained. The target media data is the media data played at the playing end.

In the method for processing playing loudness of media data according to the example, loudness processing is conducted on the media data to be played at the playing side. The current playing environment or the attribute of the playing device may influence playing of the media data, so even the same media data may cause different auditory perception when it is played in different environments or on different playing devices. In view of this, when the media data is processed at the playing side, the loudness requirement information such as the current playing environment and/or the attribute of the playing device is combined with the audio feature, such that the loudness processing information obtained can not only satisfy a demand of the audio itself, but also satisfy a demand of the environment or hardware device. In this way, adaptive adjustment of the playing loudness of the media data to be played can be implemented, and a playing effect of the media data to be played can be improved.

The example provides a method for processing playing loudness of media data, which may be applied to the computer device, such as a computer, a mobile phone, and a tablet computer. FIG. 2 is a flow diagram of a method for processing playing loudness of media data according to an example of the disclosure. As shown in FIG. 2, the flow comprises the following steps:

S201, media data to be played and an audio feature of the media data to be played are obtained. Reference may be made to S101 of the example shown in FIG. 1 for details, which will not be repeated herein.

S202, loudness requirement information is obtained.

The loudness requirement information comprises a current playing environment and/or an attribute of a playing device. Reference may be made to S102 of the example shown in FIG. 1 for details, which will not be repeated herein.

S203, loudness processing information for the media data to be played is determined based on the audio feature and the loudness requirement information.

Specifically, S203 comprises the following steps:

S2031, target loudness for the media data to be played is determined based on the loudness requirement information.

The loudness requirement information comprises a current playing environment. The noisier the current playing environment, the higher the target loudness. During the determination of the target loudness, a noise level of the current playing environment or a playing capability of the playing device may be considered.

In some optional embodiments, the attribute of the playing device comprises the playing capability. Based on this, S2031 comprises the following steps:

Step a1, initial target loudness is determined based on the playing capability.

Step a2, the initial target loudness is adjusted based on the audio feature, and the target loudness is obtained.

The attribute of the playing device may be obtained from an attribute interface of the playing device. After the playing capability is obtained, the playing capability may be mapped to loudness according to a preset mapping relation, and the initial target loudness may be obtained. Alternatively, the playing capability may be classified into a level, and different levels correspond to different initial loudness. After the playing capability of the playing device is obtained, a corresponding level is determined, such that the corresponding initial target loudness is obtained.

According to the playing capability of the playing device, the initial target loudness is determined. Based on this, the initial target loudness is finely adjusted by combining the audio feature, such that the accuracy of the target loudness obtained can be improved.

In some optional embodiments, the step a1 comprises the following steps:

Step a11, a first correspondence between the playing capability of the playing device and initial loudness is obtained.

Step a12, the first correspondence is inquired based on the playing capability of the playing device in the loudness requirement information, and the initial target loudness is obtained.

The first correspondence represents a correspondence between the playing capability of the playing device and the initial loudness. For instance, if a level of the playing capability is low, the initial loudness is −16 LU. If a level of the playing capability is medium, the initial loudness is −24 LU. If a level of playing capability is high, the initial loudness is −31 LU. For the playing device being currently used, the first correspondence is inquired after the playing capability of the playing device is obtained, such that the corresponding initial target loudness is obtained.

The first correspondence between the playing capability of the playing device and the initial loudness is maintained. The initial target loudness may be determined directly by inquiring the first correspondence during actual processing, such that determination efficiency of the initial target loudness is improved.

In some optional embodiments, the step a2 comprises the following steps:

Step a21, a target loudness increment is determined based on the audio feature, wherein the audio feature comprises a type of audio content or a speech ratio.

Step a22, the initial target loudness is adjusted based on the target loudness increment, such that the target loudness is obtained.

The audio feature comprises, but is not limited to, the type of the audio content or the speech ratio. Different audio features correspond to different target loudness increments. For instance, if the audio feature comprises the type of the audio content and the type is speech, the target loudness increment is −2 LU. If the audio feature comprises a speech ratio speech_ratio, the target loudness increment is equal to −1\*speech_ratio\*2.

Clearly, the target loudness increment may also be determined in other modes, which are not limited herein. After the target loudness increment is determined, the initial target loudness is adjusted with the target loudness increment, such that the target loudness is obtained. Further, the target loudness has a certain loudness range, such as (−50, −5). After the initial target loudness is adjusted, if the target loudness obtained exceeds the range, the target loudness needs to be processed, so as to ensure that the target loudness to be used later is within the loudness range. It should be noted that the above loudness range (−50, −5) is only illustrative, which does not limit the protection scope of the disclosure.

Different audio features have different effects on the audio perception. In view of this, obtaining a corresponding target loudness increment based on the audio feature and finely adjusting the initial target loudness can further improve the accuracy of the target loudness.

S2032, a loudness gain is determined based on a difference between source loudness in the audio feature and the target loudness.

The audio feature comprises the source loudness. The loudness gain is obtained by computing the difference between the target loudness and the source loudness. That is, the loudness gain (gain)=the target loudness−the source loudness.

Figure 3:
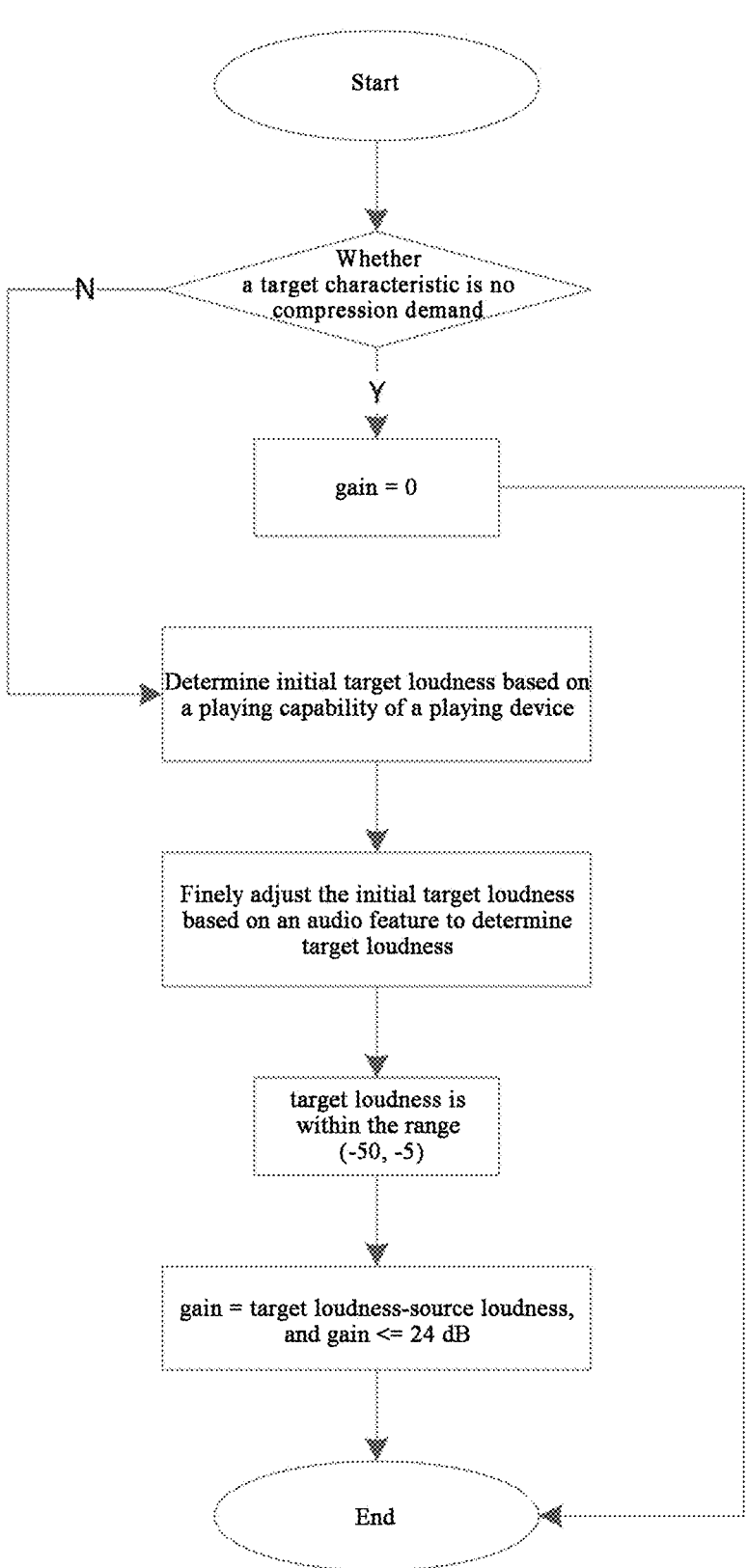
FIG. 3 is a schematic flow diagram of a method for computing a loudness gain according to an example of the disclosure.

For instance, FIG. 3 shows a processing flow of the loudness gain. Specifically, a target characteristic of dynamic range adjustment is determined based on the loudness requirement information. If the target characteristic is no compression demand, the loudness gain (gain) is equal to 0. Otherwise, the initial target loudness is determined based on the playing capability of the playing device, and further the initial target loudness is finely adjusted based on the audio feature, such that the target loudness is determined.

Because of a set target loudness range, whether the target loudness obtained is within the target loudness range (−50, −5) is determined. If the target loudness is within the target loudness range, the loudness gain (gain) is determined to be equal to the target loudness minus the source loudness, and the gain is determined to be smaller than or equal to 24 dB.

S2033, a dynamic range control parameter for the media data to be played is determined based on the audio feature and the loudness requirement information.

The dynamic range control parameter comprises a slope, a threshold of a static characteristic, and a knee width kneeWidth. The dynamic range control parameter is a parameter of a DRC curve. In the example, the DRC curve comprises two sections. A first section corresponds to the static characteristic. A threshold of the first section of the curve is the threshold of the static characteristic, and a knee position is set with the knee width. The slope refers to a slope of a second section.

In some optional embodiments, S2033 comprises the following steps:

Step b1, a second correspondence between a loudness requirement and a characteristic of dynamic range control is obtained.

Step b2, the second correspondence is inquired based on the loudness requirement information, such that a target characteristic of the dynamic range control is determined.

Step b3, in a case where the target characteristic is a compression demand, a slope of a curve of the dynamic range control is determined based on the audio feature and the target loudness. The dynamic range control parameter comprises the slope.

The characteristic of the dynamic range control comprises a compression demand and no compression demand (off). In the case where the characteristic is a compression demand, the compression may be divided into light compression and noisy compression according to a degree of compression. The characteristic of the dynamic range control is related to the loudness requirement, wherein the loudness requirement corresponds to the above loudness requirement information. The loudness requirement comprises, but is not limited to, a user preference, the playing capability of the playing device, the current playing environment, etc. In actual processing, the loudness requirement information obtained comprises one or more of the above loudness requirements. The loudness requirement information comprises different content, and accordingly the second correspondences to be inquired are different. For instance, the second correspondences may comprise a correspondence between the user preference and a characteristic of the dynamic range control, a correspondence between the playing capability of the playing device and the characteristic of the dynamic range control, a correspondence between a playing environment and the characteristic of the dynamic range control, a correspondence between the user preference as well as the playing capability of the playing device and the characteristic of the dynamic range control, etc. That is, the second correspondence comprises a correspondence between a combination of one or more loudness requirements and the characteristic of the dynamic range control.

For instance, if the loudness requirement comprises the playing environment and the playing capability of the playing device, the correspondence is shown in the following table:

| Playing environment | Playing capability | DRC characteristic |
|---|---|---|
| ideal, n/a | L | general |
| | M, n/a | general |
| noisy | L, M, S, n/a | noisy |
| ideal, n/a | S | limited |

The playing environments comprise an ideal environment, a noisy environment (noisy), and an empty environment (n/a). The playing capabilities comprise high (L), medium (M), low (S), and empty (n/a). The characteristics requiring compression of DRC comprise general compression, noisy compression, and limited compression.

If the loudness requirement comprises the user preference, the playing capability of the playing device and the playing environment, the correspondence is shown in the following table:

| User preference | Playing capability | Playing environment | DRC characteristic |
|---|---|---|---|
| Max DRC | all | all | noisy |
| Light DRC | L | ideal, n/a | light |
| | M, n/a | ideal, n/a | light |
| DRC off | M, L, n/a | ideal, n/a | off |

The user preferences comprise maximum DRC (Max DRC), light DRC, and DRC off. The playing capabilities comprise all, high (L), medium (M), low (S), and empty (n/a). The playing environments comprise all, ideal, and empty (n/a). The characteristics of DRC comprise noisy compression, light compression, and off.

Clearly, the correspondences expressed in the above two tables are only some instances, and do not limit the protection scope of the disclosure. A specific content comprised in the second correspondence is set according to actual needs.

Based on the loudness requirement information, its comprised content is determined, and then the second correspondence is inquired with the comprised content, such that the target characteristic of the dynamic range control is determined. In a case where the target characteristic is a compression demand, a slope of the DRC curve is determined based on the audio feature and the target loudness.

The second correspondence between the loudness requirement and the characteristic of the dynamic range control is maintained. The target characteristic of the dynamic range control may be obtained by directly inquiring the second correspondence during actual loudness processing, which improves the efficiency of determining the target characteristic. In addition, in a case where the target characteristic is a compression demand, the slope of the DRC curve is obtained by combining the audio feature and the target loudness. The slope is obtained based on the audio feature, and thus may be better applied to the media data to be played.

In some optional embodiments, the audio feature comprises a loudness peak value. The step b3 comprises the following steps:

Step b31, peak normalization processing is conducted on the source loudness based on the loudness peak value and a preset loudness peak value, such that processed loudness is obtained.

Step b32, an initial slope of the curve of the dynamic range control is determined based on a ratio of the processed loudness to the target loudness.

Step b33, in a case where the loudness requirement information comprises the current playing environment or a user preference, a preset slope corresponding to the target characteristic is obtained.

Step b34, the slope of the curve of the dynamic range control is determined based on a maximum value of the preset slope and the initial slope.

The preset loudness peak value is set according to actual needs, and for instance, 0 dB. The loudness peak value in the audio feature is compared with the preset loudness peak value. If the loudness peak value exceeds the preset loudness peak value, peak normalization processing needs to be conducted on the source loudness, such that the processed loudness is obtained. For instance, if the loudness peak value is 4 dB and exceeds the preset loudness peak value by 4 dB, the source loudness needs to be lowered by 4 dB to obtain the processed loudness.

The ratio of the processed loudness to the target loudness is computed and used as the initial slope of the DRC curve. Further, if the loudness requirement information comprises the current playing environment or the user preference, it may be seen according to the above correspondence that the loudness requirement information may influence the characteristic of DRC. That is, the degree of compression may be influenced in a case where the compression is in demand. If a correspondence also exists between the characteristic of DRC and the slope, the preset slope corresponding to the target characteristic may be determined based on the correspondence.

For instance, when the characteristic of DRC is off, the preset slope is 1. When the characteristic of DRC is general compression, the preset slope is 1.25. When the characteristic of DRC is noisy compression or limited compression, the preset slope is 2.5. Based on this, the preset slope corresponding to the target characteristic is obtained.

The initial slope is obtained through processing of the step b32. The preset slope is obtained through processing of the step b33. One of the two slopes needs to be selected as the slope of the DRC curve. Specifically, the two slopes are compared and the maximum slope is used as the slope of the DRC curve.

The initial slope is obtained based on the source loudness and the target loudness. In a case where the loudness requirement information comprises the current playing environment or the user preference, the preset slope corresponding to the target characteristic is also present, and then the slope is re-determined by combining the initial slope and the preset slope, which further improves the accuracy of the obtained slope.

In some optional embodiments, in a case where the target characteristic is a compression demand, S2033 further comprises the following steps:

Step b4, based on a dynamic range in the audio feature, a starting point of the dynamic range is determined.

Step b5, the starting point of the dynamic range is determined as a threshold of a static characteristic in the curve of the dynamic range control, and a knee width of the curve is determined as a preset value greater than zero.

For the DRC curve, in a case where the target characteristic is a compression demand, the parameters of the DRC curve further comprise the threshold of the static characteristic and the knee width. The audio feature comprises the dynamic range. The starting point of the dynamic range is determined as the threshold of the static characteristic, that is, a knee, and the knee width is set as the preset value greater than zero. For instance, the threshold of the static characteristic is equal to a starting value of the loudness range, and the knee width, represented as kneeWidth, is 4.

A specific value of the preset value greater than zero is set according to actual needs, which is not limited herein.

The DRC curve comprises two parts, including one part corresponding to the static characteristic and the other part corresponding to the slope. The starting point of the dynamic range is set as the threshold of the static characteristic, such that the media data to be played may be better processed through the obtained DRC curve.

In some optional embodiments, S2033 further comprises the following steps:

Step b6, whether a duration of the media data to be played is longer than a preset duration is determined, if the duration is longer than the preset duration, step b1 is executed, and if the duration is shorter than the preset duration, step b7 is executed.

Step b7, maximum short-time loudness in the audio feature is obtained, and a loudness difference between the maximum short-time loudness and the target loudness is determined.

Step b8, in a case where the loudness difference is greater than a preset loudness difference, the slope of the curve of the dynamic range control is determined based on the loudness difference and the preset loudness difference.

Step b9, in a case where the loudness difference is smaller than the preset loudness difference, it is determined that the target characteristic of the dynamic range control is no compression demand.

Parameter determination of the DRC curve is also related to the duration of the media data to be played. For media data to be played having a short duration, a corresponding slope of the DRC curve is determined through the maximum short-time loudness and the target loudness, such that a processing process is simplified, and the processing efficiency is improved. Specifically, the duration of the media data to be played is compared with the preset duration. If the duration is longer than the preset duration, the step b1 is executed, that is, the parameters of the DRC curve are determined in the mode described above. If the duration is shorter than the preset duration, the maximum short-time loudness in the audio feature is obtained, and the loudness difference between the maximum short-time loudness and the target loudness is computed. If the loudness difference is greater than the preset loudness difference, the slope of the DRC curve is determined based on the loudness difference and the preset loudness difference. The preset loudness difference may be 5 LU, or other values, which is specifically set according to actual needs.

In a case where the loudness difference is greater than the preset loudness difference, i.e., the compression is required, the slope of the DRC curve is determined based on the loudness difference and a preset duration difference. In a case where the loudness difference is smaller than the preset loudness difference, the target characteristic of the dynamic range control is to no compression demand.

In some optional embodiments, the step b8 comprises the following step: the slope of the curve of the dynamic range control is determined based on the ratio of the loudness difference to the preset loudness difference. Specifically, the slope of the DRC curve=(the maximum short-time loudness−the target loudness)/the preset loudness difference.

In a case where the loudness difference is greater than the preset loudness difference, the slope is determined based on a ratio of the loudness difference to the preset loudness difference, such that a determination mode of the ratio is simplified, and the processing efficiency is improved.

The dynamic range control parameter is determined by combining the duration of the media data to be played. In a case where the duration is shorter than the preset duration, the slope is determined based on the difference between the maximum short-time loudness and the target loudness, such that the dynamic range may be compressed within the preset loudness difference, and the tradeoff between the complexity of the algorithm and the effect of loudness balance is achieved. In a case where the loudness difference is smaller than the preset loudness difference, the dynamic range processing is not needed and the process of dynamic range processing is simplified, such that the efficiency is improved.

Figure 4:
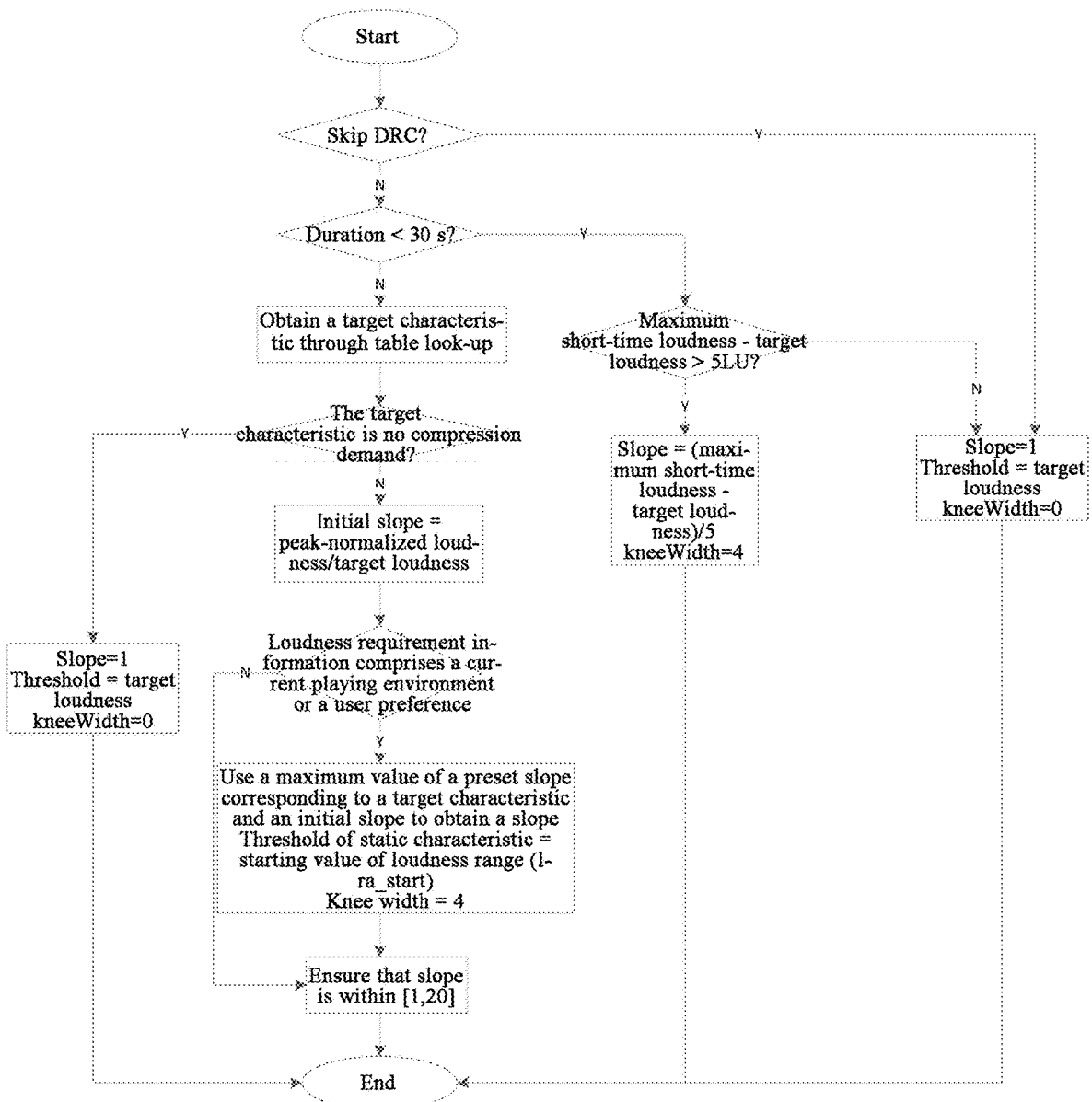
FIG. 4 is a schematic flow diagram of a method for computing a dynamic range control parameter according to an example of the disclosure.

For instance, FIG. 4 shows a determination process of the parameter of the DRC curve. Specifically, whether to skip the DRC is determined firstly. If the DRC needs to be skipped, it is indicated that no compression is required. In this case, the slope of the DRC curve is equal to 1, a threshold of a static curve is equal to the target loudness, and the knee width kneeWidth is equal to 0. If the DRC does not need to be skipped, whether the duration of the media data to be played is shorter than a duration threshold (that is, 30 s) is then determined. If the duration of the media data to be played is shorter than the duration threshold, the parameter of the DRC curve is determined based on the maximum short-time loudness and the target loudness. Reference may be made to related description of the steps b7-b9 for specific processing modes. Otherwise, the target characteristic of the dynamic range control is determined by inquiring the correspondence. If target characteristic is no compression demand, the slope of the DRC curve is equal to 1, the threshold of the static curve is equal to the target loudness, and the knee width kneeWidth is equal to 0. If the target characteristic is a compression demand, the parameter of the DRC curve is determined based on the description of the step b3.

S2034, a loudness compensation gain is obtained.

The loudness compensation gain is obtained based on a loudness offset. The loudness processing information comprises the loudness gain, the dynamic range control parameter, and the loudness compensation gain.

The loudness compensation gain may be determined by scanning the loudness of the media data to be played twice and obtaining the loudness offset, or by determining the loudness offset through analysis of a huge amount of data. For instance, if a huge amount of data is analyzed, the loudness offset is obtained by running the data on a specific dynamic range to obtain a loudness offset of the starting point and the ending point and performing a linear regression, and the loudness offset is determined as the loudness compensation gain.

In some optional embodiments, in a case where the twice loudness scanning is used, S2034 comprises the following steps:

Step c1, the loudness offset is determined based on the audio feature and the target loudness.

Step c2, the loudness compensation gain is determined based on the loudness offset.

The audio feature comprises the starting point of the dynamic range or the maximum short-time loudness. By combining this with the target loudness, the loudness offset may be obtained. After the loudness offset is obtained, the loudness offset may be determined as the loudness compensation gain, or the loudness compensation gain may be obtained by combining the loudness offset with the preset value.

The loudness offset is computed based on the audio feature and the target loudness. Based on this, the loudness compensation gain is determined. Because the audio feature represents a condition of the audio itself, by combining this with the target loudness to determine the loudness offset, the accuracy of the loudness offset is improved, and thus the accuracy of the determined loudness compensation gain is improved.

The loudness compensation gain is determined in different modes according to the duration of the media data to be played. If the duration is longer than the preset duration, loudness estimation needs to be conducted firstly, and then the loudness offset is determined. If the duration is shorter than the preset duration, the loudness offset is determined based on the maximum short-time loudness.

In some optional embodiments, in a case where the duration of the media data to be played is longer than the preset duration, the step c1 comprises the following steps:

Step c11, the slope in the dynamic range control parameter and a starting point of a dynamic range in the audio feature are obtained.

Step c12, loudness estimation is conducted based on the target loudness, the slope and the starting point, and estimated loudness is determined.

Step c13, the loudness offset is determined based on a difference between the target loudness and the estimated loudness.

In a case where the duration of the media data to be played is longer than the preset duration, the slope of the DRC curve obtained through the processing of the above steps is obtained, and the starting point of the dynamic range is obtained from the audio feature. Loudness estimation is conducted based on the target loudness, the slope and the starting point. That is, the estimated loudness=(the target loudness−the starting point of the dynamic range)/the slope+ the starting point of the dynamic range.

After the estimated loudness is obtained, the difference between the target loudness and the estimated loudness is computed, and the loudness offset is determined.

In a case where the duration of the media data to be played is longer than the preset duration, since the loudness gain and the dynamic range processing is performed before the loudness compensation, and loudness estimation is conducted by combining the starting point and the ratio of the dynamic range, the accuracy of the obtained loudness estimation can be ensured.

Accordingly, if the duration of the media data to be played is longer than the preset duration, the step c2 comprises the following step: the loudness compensation gain is obtained based on the sum of the loudness offset and a first compensation value. The first compensation value may be set according to an empirical value or obtained by analyzing a huge amount of data. For instance, the first compensation value is 1, and accordingly, the loudness compensation gain=the target loudness−the estimated loudness+1.

The loudness compensation gain is obtained by combining the loudness offset and the first compensation value, such that the accuracy of the loudness compensation gain is further improved.

In some optional embodiments, in a case where the duration of the media data to be played is shorter than the preset duration, the step c1 comprises the following steps:

Step c14, maximum short-time loudness in the audio feature is obtained.

Step c15, the loudness offset is determined based on a difference between the maximum short-time loudness and the target loudness.

In a case where the duration of the media data to be played is shorter than the preset duration, the difference between the maximum short-time loudness and the target loudness is computed. The difference may be directly determined as the loudness offset, or the difference may be combined with another parameter to determine the loudness offset.

In a case where the duration of the media data to be played is shorter than the preset duration, the processing of the loudness offset is simplified, and the loudness offset is determined directly based on the difference between the maximum short-time loudness and the target loudness, such that the processing efficiency is improved.

Accordingly, in a case where the duration of the media data to be played is shorter than the preset duration, the step c2 comprises the following steps:

Step c21, in a case where the loudness offset is greater than a preset loudness difference, the loudness compensation gain is obtained based on a difference between the loudness offset and a second compensation value.

Step c22, in a case where the loudness offset is smaller than the preset loudness difference, the loudness compensation gain is determined as zero.

In a case where the loudness offset is greater than the preset loudness difference, the loudness compensation gain=the maximum short-time loudness−the target loudness−the second compensation value. In a case where the loudness offset is smaller than the preset loudness difference, the loudness compensation gain=0. A specific value of the second compensation value is set according to actual needs. For instance, the second compensation value=5, which is not limited herein.

By determining the loudness compensation gain in different modes according to a relation between the loudness offset and the preset loudness difference, the accuracy of the loudness compensation gain is further improved.

Figure 5:
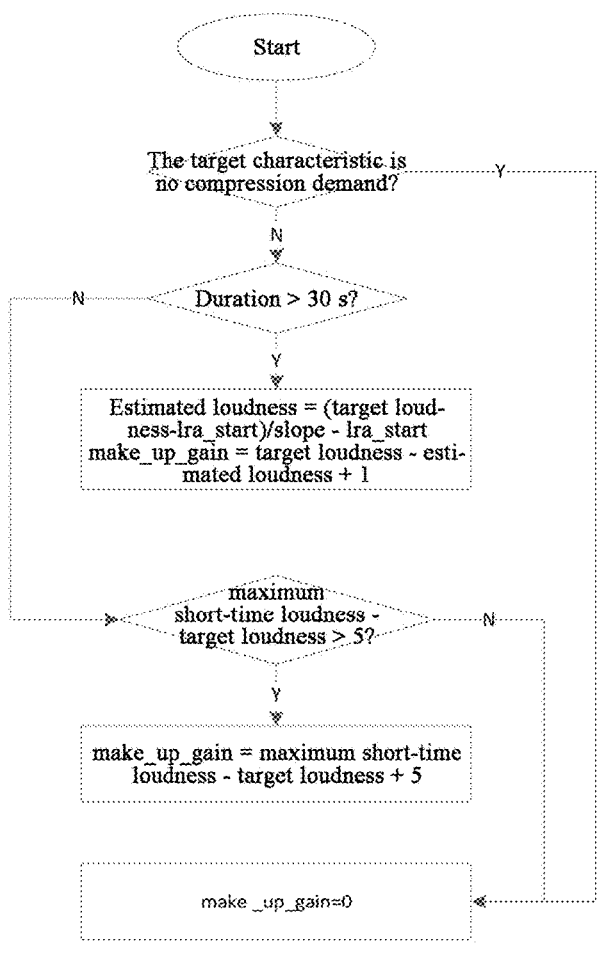
FIG. 5 is a schematic flow diagram of a method for computing a loudness compensation gain according to an example of the disclosure.

For instance, FIG. 5 shows a determination mode of the loudness compensation gain. Specifically, if the target characteristic is no compression demand, the loudness compensation gain, represented as make up_gain, is equal to 0. If the target characteristic is a compression demand, whether the duration of the media data to be played is longer than the preset duration needs to be re-determined. If the duration is longer than the preset duration, the loudness compensation gain is determined according to the above description from the steps c11-c13. If the duration is shorter than the preset duration, the loudness compensation gain is determined according to the above description from the steps c14-c15.

It should be noted that during comparison, a processing mode in a case that the duration is equal to the preset duration may be the same as that in a case that the duration is longer than the preset duration, or the same as that in a case that the duration is shorter than the preset duration, which is set according to the actual needs and is not limited herein.

S204, the media data to be played is processed based on the loudness processing information, and target media data for playing is obtained.

Specifically, S204 comprises the following steps:

S2041, loudness processing is conducted on the media data to be played based on the loudness gain, such that first media data is obtained.

S2042, dynamic range processing is conducted on the first media data based on the dynamic range control parameter, such that second media data is obtained.

S2043, loudness compensation is conducted on the second media data based on the loudness compensation gain, such that third media data is obtained.

S2044, peak limiting is conducted on the third media data, such that target media data is obtained.

The loudness processing information comprises the loudness gain, the parameter of the DRC curve, and the loudness compensation gain. Based on this, loudness processing is conducted on the media data to be played based on the loudness gain, such that the first media data is obtained; then, the DRC curve is obtained based on the parameter of the DRC curve, then dynamic range processing is conducted on the first media data based on the DRC curve, such that the second media data is obtained; and then, loudness compensation is conducted on the second media data based on the loudness compensation gain, such that the third media data is obtained. Finally, peak limiting is conducted on the third media data in combination with a preset peak value, such that the target media data for playing is obtained.

Figure 6:
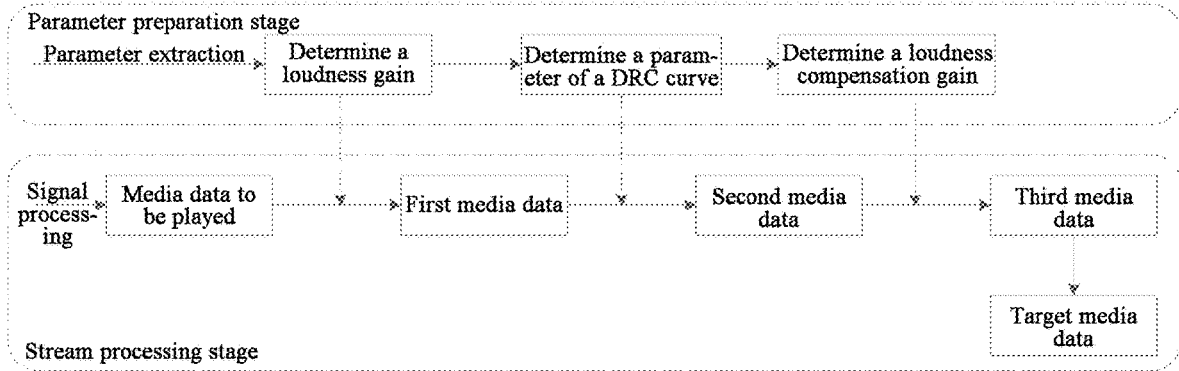
FIG. 6 is a schematic flow diagram of a method for processing media data to be played according to an example of the disclosure.

For instance, FIG. 6 shows a processing flow of the media data to be played. The entire flow may comprise a parameter preparation stage and a stream processing stage. The preparation stage comprises the steps: a loudness gain is determined, a parameter of the DRC curve is determined, and a loudness compensation gain is determined. The stream processing stage comprises the following steps: loudness gain processing is conducted on the media data to be played with the loudness gain to obtain the first media data; the DRC curve is obtained based on the parameter of the DRC curve, then dynamic range control processing is conducted on the first media data with the DRC curve to obtain the second media; then, loudness compensation is conducted on the second media data in combination with the loudness compensation gain to obtain the third media data; and finally, peak limiting is conducted on the third media data to obtain the target media data.

In the method for processing playing loudness of media data according to the example, the target loudness is determined based on the loudness requirement information. That is, the loudness is set as required, such that matching of the target loudness with the playing environment and the playing device is ensured. The dynamic range control parameter is obtained by combining the audio feature with the loudness requirement information, which is not only related to the audio feature, but also combined with the playing environment and the characteristic of playing hardware, such that adaptability of the dynamic range control parameter is ensured. The loudness processing information further comprises the loudness compensation gain, such that the accuracy of the loudness processing information is further ensured. The loudness processing, dynamic range processing and loudness compensation is sequentially conducted on the media data to be played, and the loudness processing is conducted on the media data to be played from perspectives of loudness and the dynamic range. Because the loudness peak value may be influenced in the process, peak limiting is further conducted, such that sonic boom of the target media data obtained is reduced.

As a specific application example of the example of the disclosure, a short video playing application is configured on a mobile phone, and a user may play a short video through interaction with the short video playing application. The short video playing application is further configured with an interaction interface allowing the user to input corresponding preference data and obtain the loudness requirement information. Specifically, a short video to be played is pulled from a server of the short video playing application, and after the short video to be played is obtained, loudness of each short video to be played is balanced through the above method for processing playing loudness of media data, such that the adaptive adjustment of loudness is ensured.

The example further provides an apparatus for processing playing loudness of media data. The apparatus is configured to implement the example and preferred embodiments. The content illustrated above will not be repeated herein. The term "module", as used below, may achieve a combination of software and/or hardware having predetermined functions. While the apparatus described in the following examples is preferably achieved in software, achievement of hardware, or a combination of software and hardware, is also possible and conceivable.

Figure 7:
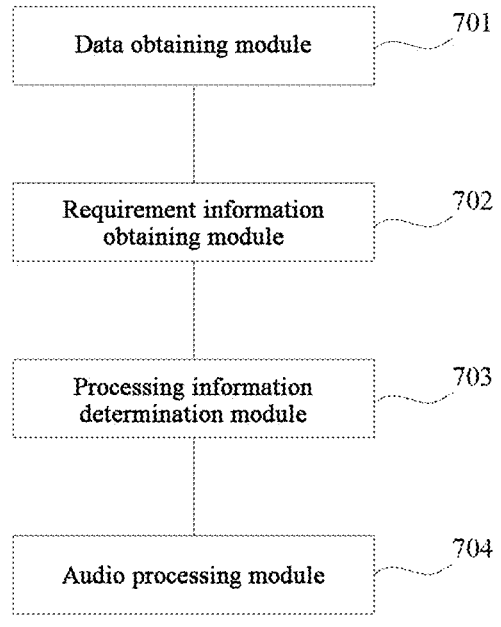
FIG. 7 is a schematic structural diagram of an apparatus for processing playing loudness of media data according to an example of the disclosure.

The example provides an apparatus for processing playing loudness of media data. As shown in FIG. 7, the apparatus comprises:

a data obtaining module 701 configured to obtain media data to be played and an audio feature of the media data to be played;

a requirement information obtaining module 702 configured to obtain loudness requirement information, where the loudness requirement information comprises a current playing environment and/or an attribute of a playing device;

a processing information determination module 703 configured to determine loudness processing information for the media data to be played based on the audio feature and the loudness requirement information; and an audio processing module 704 configured to process the media data to be played based on the loudness processing information to obtain target media data for playing.

In some optional embodiments, the processing information determination module 703 comprises:

a target loudness determination unit configured to determine target loudness for the media data to be played based on the loudness requirement information;

a loudness gain determination unit configured to determine a loudness gain based on a difference between source loudness in the audio feature and the target loudness;

a parameter determination unit configured to determine a dynamic range control parameter for the media data to be played based on the audio feature and the loudness requirement information; and a compensation gain obtaining unit configured to obtain a loudness compensation gain, where the loudness compensation gain is obtained based on a loudness offset, and the loudness processing information comprises the loudness gain, the dynamic range control parameter, and the loudness compensation gain.

In some optional embodiments, the attribute of the playing device comprise a playing capability. The target loudness determination unit comprises:

an initial target loudness determination sub-unit configured to determine initial target loudness based on the playing capability; and a loudness adjustment sub-unit configured to adjust the initial target loudness based on the audio feature to obtain the target loudness.

In some optional embodiments, the initial target loudness determination sub-unit comprises:

a first correspondence obtaining sub-unit configured to obtain a first correspondence between the playing capability of the playing device and initial loudness; and a first inquiring sub-unit configured to inquire the first correspondence based on the playing capability of the playing device in the loudness requirement information to obtain the initial target loudness.

In some optional embodiments, the loudness adjustment sub-unit comprises:

a loudness increment determination sub-unit configured to determine a target loudness increment based on the audio feature, where the audio feature comprises a type of an audio content or a speech ratio; and an adjustment sub-unit configured to adjust the initial target loudness based on the target loudness increment to obtain the target loudness.

In some optional embodiments, the parameter determination unit comprises:

a second correspondence obtaining sub-unit configured to obtain a second correspondence between a loudness requirement and a characteristic of dynamic range control;

a target characteristic determination sub-unit configured to inquire the second correspondence based on the loudness requirement information, and determine a target characteristic of the dynamic range control; and a first slope determination sub-unit configured to determine, in a case where the target characteristic is a compression demand, a slope of a curve of the dynamic range control based on the audio feature and the target loudness, where the dynamic range control parameter comprises the slope.

In some optional embodiments, the audio feature comprises a loudness peak value. A slope determination sub-unit comprises:

a normalization sub-unit configured to conduct peak normalization processing on the source loudness based on the loudness peak value and a preset loudness peak value to obtain loudness processed;

an initial slope determination sub-unit configured to determine an initial slope of the curve of the dynamic range control based on a ratio of the processed loudness to the target loudness;

a preset slope obtaining sub-unit configured to obtain, in a case where the loudness requirement information comprises the current playing environment or a user preference, a preset slope corresponding to the target characteristic; and a curve slope determination sub-unit configured to determine the slope of the curve of the dynamic range control based on a maximum value of the preset slope and the initial slope.

In some optional embodiments, in a case where the target characteristic is a compression demand, the parameter determination unit further comprises:

a starting point determination sub-unit configured to determine, based on a dynamic range in the audio feature, a starting point of the dynamic range; and a threshold determination sub-unit configured to determine the starting point of the dynamic range as a threshold of a static characteristic in the curve of the dynamic range control, and determine a knee width of the curve as a preset value greater than zero.

In some optional embodiments, the parameter determination unit further comprises:

an execution sub-unit configured to execute, in a case where duration of the media data to be played is longer than preset duration, the step of obtaining the second correspondence between the loudness requirement and the characteristic of the dynamic range control;

a maximum short-time loudness obtaining sub-unit configured to obtain, in a case where the duration is shorter than the preset duration, maximum short-time loudness in the audio feature, and determine a loudness difference between the maximum short-time loudness and the target loudness; and a curve slope determination sub-unit configured to determine, in a case where the loudness difference is greater than a preset loudness difference, the slope of the curve of the dynamic range control based on the loudness difference and the preset loudness difference.

In some optional embodiments, the curve slope determination sub-unit comprises:

a second slope determination sub-unit configured to determine the slope of the curve of the dynamic range control based on a ratio of the loudness difference to the preset loudness difference.

In some optional embodiments, the parameter determination unit further comprises:

a compression-free determination sub-unit configured to determine, in a case where the loudness difference is smaller than the preset loudness difference, that the target characteristic of the dynamic range control is to require no compression.

In some optional embodiments, the compensation gain obtaining unit comprises:

a loudness offset sub-unit configured to determine the loudness offset based on the audio feature and the target loudness; and a loudness compensation gain determination sub-unit configured to determine the loudness compensation gain based on the loudness offset.

In some optional embodiments, in a case where duration of the media data to be played is longer than preset duration, the loudness offset sub-unit comprises:

a starting point obtaining sub-unit configured to obtain the slope in the dynamic range control parameter and a starting point of a dynamic range in the audio feature;

a loudness estimation sub-unit configured to conduct loudness estimation based on the target loudness, the slope and the starting point, and determine estimated loudness; and an offset determination sub-unit configured to determine the loudness offset based on a difference between the target loudness and the estimated loudness.

In some optional embodiments, the loudness compensation gain determination sub-unit comprises:

a compensation gain determination sub-unit configured to obtain the loudness compensation gain based on the sum of the loudness offset and a first compensation value.

In some optional embodiments, in a case where duration of the media data to be played is shorter than preset duration, the loudness offset sub-unit comprises:

a short-time loudness obtaining sub-unit configured to obtain maximum short-time loudness in the audio feature; and an offset sub-unit configured to determine the loudness offset based on a difference between the maximum short-time loudness and the target loudness.

In some optional embodiments, the loudness compensation gain determination sub-unit comprises:

a first gain sub-unit configured to obtain, in a case where the loudness offset is greater than a preset loudness difference, the loudness compensation gain based on a difference between the loudness offset and a second compensation value; and a second gain sub-unit configured to determine, in a case where the loudness offset is smaller than the preset loudness difference, the loudness compensation gain as zero.

In some optional embodiments, the audio processing module 704 comprises:

a loudness processing unit configured to conduct loudness processing on the media data to be played based on the loudness gain to obtain first media data;

a dynamic range processing unit configured to conduct dynamic range processing on the first media data based on the dynamic range control parameter to obtain second media data;

a loudness compensation unit configured to conduct loudness compensation on the second media data based on the loudness compensation gain to obtain third media data; and a peak limiting unit configured to conduct peak limiting on the third media data to obtain the target media data.

The apparatus for processing playing loudness of media data in the example is presented in a form of functional units, which refer to an application specific integrated circuit (ASIC), a processor and a memory that execute one or more software or fixed programs, and/or other devices that may provide the above functions.

Further functional descriptions of the above modules and units are the same as those of the above corresponding examples, which will not be repeated herein.

An example of the disclosure further provides a computer device, which has the apparatus for processing playing loudness of media data as shown in FIG. 7.

Figure 8:
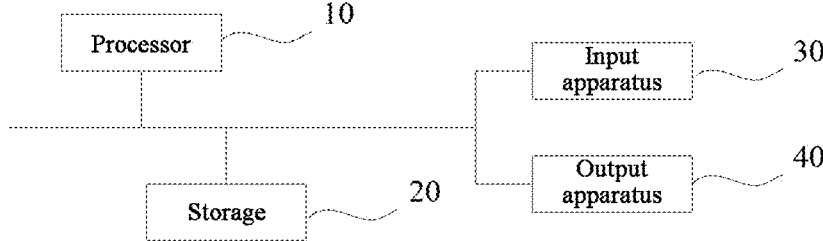
FIG. 8 is a schematic diagram of a hardware structure of a computer device according to an example of the disclosure.

With reference to FIG. 8, FIG. 8 is a schematic structural diagram of a computer device according to an optional example of the disclosure. As shown in FIG. 8, the computer device comprises: one or more processors 10, a storage 20, and interfaces for connecting all components, which comprise a high-speed interface and a low-speed interface. All the components are in communication connection with one another with different buses, and may be mounted on a common mainboard or in other ways as required. The processor may process instructions executed in the computer device, which comprise instructions stored in or on the storage so as to display graphical information of a graphical user interface (GUI) on an external input/output apparatus (such as a display device coupled to the interface). In some optional embodiments, a plurality of processors and/or a plurality of buses may be used with a plurality of memories if required. Similarly, a plurality of computer devices may be connected, and each device provides some necessary operations (for instance, serving as a server array, a group of blade servers, or a multiprocessor system). In FIG. 8, a processor 10 is taken as an instance.

The processor 10 may be a central processing unit, a network processor, or a combination thereof. The processor 10 may further comprise a hardware chip. The hardware chip may be an application specific integrated circuit, a programmable logic device, or a combination thereof. The programmable logic device may be a complex programmable logic device, a field programmable logic gate array, a generic array logic, or any combination thereof.

The storage 20 stores an instruction executable by at least one processor 10, so as to enable the at least one processor 10 to implement the method according to the above examples.

The storage 20 may comprise a program storage area and a data storage area, where the program storage area may store an operating system and an application required for at least one function; and the data storage area may store data, etc. created according to usage of a computer device. Moreover, the storage 20 may comprise a high-speed random access memory, and may further comprise a non-volatile storage, for instance, at least one magnetic disk storage device, a flash memory device, or other non-volatile solid-state memory devices. In some optional embodiments, the storage 20 optionally comprises a storage remotely arranged with respect to the processor 10. The remote memories may be connected to the computer device by means of a network. Instances of the network comprise, but are not limited to, the Internet, an enterprise intranet, a local area network, a mobile communication network, and a combination thereof.

The storage 20 may comprise a volatile storage, and for instance, a random access memory. The storage may also comprise a non-volatile storage, and for instance, a flash memory, a hard disk, or a solid-state hard disk. The storage 20 may also comprise a combination of the above types of storage.

The computer device further comprises an input apparatus 30 and an output apparatus 40. The processor 10, the storage 20, the input apparatus 30 and the output apparatus 40 may be connected by means of buses or in other ways. In FIG. 8, bus connection is taken as an instance.

The input apparatus 30 may receive input digital or character information and generate key signal input related to user settings and function control of the computer device, for instance, a touch screen, a keypad, a mouse, a track pad, a touch pad, an indication rod, one or more mouse buttons, a trackball, a joystick, etc. The output apparatus 40 may comprise a display device, an auxiliary lighting apparatus (for instance, a light emitting diode (LED)), a tactile feedback apparatus (for instance, a vibration motor), etc. The display device comprises, but is not limited to, a liquid crystal display, a light emitting diode, a display, and a plasma display. In some optional embodiments, the display device may be a touch screen.

An example of the disclosure further provides a computer-readable storage medium. The method according to the examples of the disclosure may be implemented in hardware or firmware, or implemented as a computer code that may be recorded in the storage medium or downloaded through a network, which is originally stored in a remote storage medium or a non-transitory machine-readable storage medium and is to be stored in a local storage medium, such that the method described herein may be stored in such software processing on a storage medium using a general-purpose computer, a special-purpose processor, or programmable or special-purpose hardware. The storage medium may be a magnetic disk, an optical disk, a read only memory, a random access memory, a flash memory, a hard disk or a solid-state hard disk. Further, the storage medium may also comprise a combination of the above types of memories. It may be understood that a computer, a processor, a microprocessor controller or programmable hardware comprises a storage component that may store or receive software or a computer code, and when the software or computer code is accessed and executed by the computer, the processor or the hardware, the method shown in the above examples is implemented.

It may be understood that before usage of the technical solution disclosed in all the examples of the disclosure, a user has to be informed about a type, a use scope, a use scene, etc. of personal information involved in the disclosure in an appropriate way in accordance with relevant laws and regulations and user authorization has to be obtained.

For instance, in response to receiving an active request of a user, prompt information is transmitted to the user, so as to clearly remind the user that an operation requested by the user is about to require obtaining and using of personal information of the user. Therefore, the user may independently choose to provide or not provide the personal information to software or hardware such as an electronic device, an application, a server or a storage medium that executes an operation of the technical solution of the disclosure according to the prompt information.

As an optional and non-limitative embodiment, in response to receiving the active request of the user, a mode of transmitting the prompt information to the user may be, for instance, a pop-up window mode, in which the prompt information may be presented in a character form. In addition, the pop-up window may further carry a selection control allowing the user to choose to "agree" or "disagree" to provide the personal information to the electronic device.

It may be understood that the above process of informing and obtaining user authorization is only illustrative, and does not limit the embodiment of the disclosure. Other modes satisfying relevant laws and regulations may also be applied to the embodiment of the disclosure.

Although the examples of the disclosure are described in connection with the drawings, those skilled in the art can make various modifications and variations without departing from the spirit and scope of the disclosure, and such modifications and variations shall all fall within the scope defined by the appended claims.

We claim:

1. A method for processing playing loudness of media data, comprising:
    obtaining media data and an audio feature of the media data;
    obtaining loudness requirement information, wherein the loudness requirement information comprises a current playing environment and/or an attribute of a playing device;
    determining loudness processing information for the media data based on the audio feature and the loudness requirement information; and
    processing the media data based on the loudness processing information to obtain first media data for playing,
    wherein determining the loudness processing information for the media data based on the audio feature and the loudness requirement information comprises:
        obtaining a loudness compensation gain, wherein the loudness compensation gain is obtained based on a loudness offset,
    wherein obtaining the loudness compensation gain comprises:
        determining the loudness offset based on the audio feature and a first loudness for the media data, and
    wherein, in a case where duration of the media data is longer than preset duration, determining the loudness offset based on the audio feature and the first loudness comprises:
        obtaining a slope in a dynamic range control parameter and a starting point of a dynamic range in the audio feature;
        conducting loudness estimation based on the first loudness, the slope and the starting point to determine estimated loudness; and
        determining the loudness offset based on a difference between the first loudness and the estimated loudness.

2. The method according to claim 1, wherein determining the loudness processing information for the media data based on the audio feature and the loudness requirement information comprises:
    determining the first loudness for the media data based on the loudness requirement information;
    determining a loudness gain based on a difference between source loudness in the audio feature and the first loudness;
    determining the dynamic range control parameter for the media data based on the audio feature and the loudness requirement information,
    wherein the loudness processing information comprises the loudness gain, the dynamic range control parameter and the loudness compensation gain.

3. The method according to claim 2, wherein the attribute of the playing device comprises a playing capability, and determining the first loudness for the media data based on the loudness requirement information comprises:
    determining initial first loudness based on the playing capability; and
    adjusting the initial first loudness based on the audio feature to obtain the first loudness.

4. The method according to claim 3, wherein determining the initial first loudness based on the playing capability comprises:
    obtaining a first correspondence between the playing capability of the playing device and initial loudness; and
    inquiring the first correspondence based on the playing capability of the playing device in the loudness requirement information to obtain the initial first loudness.

5. The method according to claim 3, wherein adjusting the initial first loudness based on the audio feature to obtain the first loudness comprises:
    determining a first loudness increment based on the audio feature, wherein the audio feature comprises a type of audio content or a speech ratio; and
    adjusting the initial first loudness based on the first loudness increment to obtain the first loudness.

6. The method according to claim 2, wherein determining the dynamic range control parameter for the media data based on the audio feature and the loudness requirement information comprises:
    obtaining a second correspondence between a loudness requirement and a characteristic of dynamic range control;
    inquiring the second correspondence based on the loudness requirement information to determine a first characteristic of the dynamic range control; and
    determining, in a case where the first characteristic is a compression demand, the slope of a curve of the dynamic range control based on the audio feature and the first loudness, wherein the dynamic range control parameter comprises the slope.

7. The method according to claim 6, wherein the audio feature comprises a loudness peak value, and determining the slope of the curve of the dynamic range control based on the audio feature and the first loudness comprises:
    conducting peak normalization processing on the source loudness based on the loudness peak value and a preset loudness peak value to obtain processed loudness;
    determining an initial slope of the curve of the dynamic range control based on a ratio of the processed loudness to the first loudness;

obtaining, in a case where the loudness requirement information comprises the current playing environment or a user preference, a preset slope corresponding to the first characteristic; and determining the slope of the curve of the dynamic range control based on a maximum value of the preset ratio and the initial ratio.

8. The method according to claim 6, wherein in a case where the first characteristic is the compression demand, determining the dynamic range control parameter for the media data based on the audio feature and the loudness requirement information further comprises:

determining, based on a dynamic range in the audio feature, the starting point of the dynamic range; and determining the starting point of the dynamic range as a threshold of a static characteristic in the curve of the dynamic range control, and determining a knee width of the curve as a preset value greater than zero.

9. The method according to claim 6, wherein determining the dynamic range control parameter for the media data based on the audio feature and the loudness requirement information further comprises:

executing, in the case where duration of the media data is longer than preset duration, a step of obtaining the second correspondence between the loudness requirement and the characteristic of the dynamic range control;

obtaining, in a case where the duration is shorter than the preset duration, maximum short-time loudness in the audio feature, and determining a loudness difference between the maximum short-time loudness and the first loudness; and determining, in a case where the loudness difference is greater than a preset loudness difference, the slope of the curve of the dynamic range control based on the loudness difference and the preset loudness difference.

10. The method according to claim 9, wherein determining the slope of the curve of the dynamic range control based on the loudness difference and the preset loudness difference comprises:

determining the slope of the curve of the dynamic range control based on a ratio of the loudness difference to the preset loudness difference.

11. The method according to claim 9, wherein determining the dynamic range control parameter for the media data based on the audio feature and the loudness requirement information further comprises:

determining, in a case where the loudness difference is smaller than the preset loudness difference, that the first characteristic of the dynamic range control is no compression demand.

12. The method according to claim 2, wherein obtaining the loudness compensation gain further comprises:

determining the loudness compensation gain based on the loudness offset.

13. The method according to claim 12, wherein determining the loudness compensation gain based on the loudness offset comprises:

obtaining the loudness compensation gain based on a sum of the loudness offset and a first compensation value.

14. The method according to claim 2, wherein in a case where duration of the media data is shorter than preset duration, determining the loudness offset based on the audio feature and the first loudness comprises:

obtaining maximum short-time loudness in the audio feature; and determining the loudness offset based on a difference between the maximum short-time loudness and the first loudness.

15. The method according to claim 14, wherein determining the loudness compensation gain based on the loudness offset comprises:

obtaining, in a case where the loudness offset is greater than a preset loudness difference, the loudness compensation gain based on a difference between the loudness offset and a second compensation value; and determining, in a case where the loudness offset is smaller than the preset loudness difference, the loudness compensation gain as zero.

16. The method according to claim 2, wherein processing the media data based on the loudness processing information to obtain the first media data for playing comprises:

conducting loudness processing on the media data based on the loudness gain to obtain second media data;

conducting dynamic range processing on the second media data based on the dynamic range control parameter to obtain third media data;

conducting loudness compensation on the third media data based on the loudness compensation gain to obtain fourth media data; and conducting peak limiting on the fourth media data to obtain the first media data.

17. A computer device, comprising:

a memory and a processor, wherein the memory is in communication connection with the processor, the memory stores a computer instruction, and the processor executes the computer instruction to:

obtain media data and an audio feature of the media data;

obtain loudness requirement information, wherein the loudness requirement information comprises a current playing environment and/or an attribute of a playing device;

determine loudness processing information for the media data based on the audio feature and the loudness requirement information; and process the media data based on the loudness processing information to obtain first media data for playing, wherein determining the loudness processing information for the media data based on the audio feature and the loudness requirement information comprises:

obtaining a loudness compensation gain, wherein the loudness compensation gain is obtained based on a loudness offset, wherein obtaining the loudness compensation gain comprises:

determining the loudness offset based on the audio feature and a first loudness for the media data, and wherein in a case where duration of the media data is longer than preset duration, determining the loudness offset based on the audio feature and the first loudness comprises:

obtaining a slope in a dynamic range control parameter and a starting point of a dynamic range in the audio feature;

conducting loudness estimation based on the first loudness, the slope and the starting point to determine estimated loudness; and determining the loudness offset based on a difference between the first loudness and the estimated loudness.

18. The computer device according to claim 17, wherein determining the loudness processing information for the media data based on the audio feature and the loudness requirement information comprises:

determining the first loudness for the media data based on the loudness requirement information;

determining a loudness gain based on a difference between source loudness in the audio feature and the first loudness;

determining the dynamic range control parameter for the media data based on the audio feature and the loudness requirement information, wherein the loudness processing information comprises the loudness gain, the dynamic range control parameter and the loudness compensation gain.

19. A non-transitory computer-readable storage medium, storing a computer instruction, wherein the computer instruction is configured to cause a computer to:

obtain media data and an audio feature of the media data;

obtain loudness requirement information, wherein the loudness requirement information comprises a current playing environment and/or an attribute of a playing device;

determine loudness processing information for the media data based on the audio feature and the loudness requirement information; and process the media data based on the loudness processing information to obtain first media data for playing, wherein determining the loudness processing information for the media data based on the audio feature and the loudness requirement information comprises:

obtaining a loudness compensation gain, wherein the loudness compensation gain is obtained based on a loudness offset, wherein obtaining the loudness compensation gain comprises:

determining the loudness offset based on the audio feature and a first loudness for the media data, and wherein in a case where duration of the media data is longer than preset duration, determining the loudness offset based on the audio feature and the first loudness comprises:

obtaining a slope in a dynamic range control parameter and a starting point of a dynamic range in the audio feature;

conducting loudness estimation based on the first loudness, the slope and the starting point to determine estimated loudness; and determining the loudness offset based on a difference between the first loudness and the estimated loudness.

\* \* \* \* \*